United States Patent

Kita et al.

[11] Patent Number: 5,811,761
[45] Date of Patent: Sep. 22, 1998

[54] CERAMIC SHEATH DEVICE WITH MULTILAYER SILICON NITRIDE FILLER INSULATION

[75] Inventors: Hideki Kita, Fujisawa; Hisataka Numao, Kawasaki; Hideo Kawamura, Samukawa-machi, all of Japan

[73] Assignee: Isuzu Ceramics Research Institute Co., Ltd., Kanagawa, Japan

[21] Appl. No.: 630,273

[22] Filed: Apr. 10, 1996

[30] Foreign Application Priority Data

Oct. 12, 1995 [JP] Japan ..................................... 7-289192

[51] Int. Cl.$^6$ .............................. C04B 35/58; F23Q 7/00
[52] U.S. Cl. .......................... 219/270; 219/548; 219/544; 338/226; 374/208
[58] Field of Search ...................... 219/270, 544, 219/546, 548; 123/145 A; 361/264–266; 501/97.1; 338/243, 247, 248, 250, 226; 374/208, 209

[56] References Cited

U.S. PATENT DOCUMENTS

| 4,786,781 | 11/1988 | Nozaki et al. | 219/270 |
| 5,084,606 | 1/1992 | Bailey et al. | 219/270 |
| 5,304,778 | 4/1994 | Dasgupta et al. | 219/270 |

FOREIGN PATENT DOCUMENTS

| 57-19583 | 4/1982 | Japan . | |
| 60-19404 | 5/1985 | Japan . | |
| 61-246636 | 11/1986 | Japan . | |
| 63-11574 | 1/1988 | Japan . | |
| 3-140710 | 6/1991 | Japan | 219/270 |
| 3-282123 | 11/1991 | Japan . | |
| 7-208741 | 8/1995 | Japan . | |
| 7-217886 | 8/1995 | Japan . | |
| 8-250262 | 9/1996 | Japan . | |
| 2051225 | 1/1981 | United Kingdom . | |

OTHER PUBLICATIONS

H. Masayasu, "Patent Abstracts of Japan", JP 57 073326, vol. 6, No. 157, May 8, 1982.

*Primary Examiner*—John A. Jeffery
*Attorney, Agent, or Firm*—Browdy and Neimark

[57] ABSTRACT

A ceramic sheath capable of preventing damage to conductive wire rod exhibits excellent thermal resistance and a thermal shock resistance. A conductive wire rod is provided in a protective pipe of silicon nitride, silicon carbide or SiAlON so as to extend longitudinally from one end toward the other, and buried in a filler of reaction sintered silicon nitride. The filler comprises two layers, i.e. a core portion having a low sintering time size variation ratio, and a seal portion constituting a boundary layer between the core portion and the protective pipe and having a sintering time size variation ratio higher than that of the core portion. The conductive wire rod comprises a coil of a metal wire. The coil is formed helically along its whole length, and the winding pitch of the coil is set small, large and small in this order from the front end portion of the shell of the protective pipe toward its base end portion.

10 Claims, 5 Drawing Sheets

CERAMIC SHEATH DEVICE WITH MULTILAYER SILICON NITRIDE FILLER INSULATION

BACKGROUND OF THE INVENTION

1. Field of the Invention

This invention relates to a ceramic sheath device, hereinafter simply referred to as a "ceramic sheath", capable of being used for a glow heater or a thermocouple, manufactured by subjecting a material comprising a ceramic shell and a heating wire or coil inserted in the shell to a reaction sintering method; and a method of manufacturing the same.

2. Description of the Prior Art

A conventional ceramic sheath has been developed for a glow plug, i.e. a glow heater for an auxiliary fuel ignitor in a diesel engine. A thermocouple uses various measuring materials in order to measure the temperatures in the range of 300° C.–1400° C. In order to manufacture a glow heater, a molded body is formed by depositing a material containing Si and Ti on a W coil, and this molded body is inserted in a sheath or pipe of $Si_3N_4$, the resultant product being then reaction sintered. A glow heater obtained has uniform composition (refer to, for example, Japanese Patent Laid-Open No. 217886/1995). A wire strand of a thermocouple is affected easily by an oxidizing or reducing atmosphere in many cases, and it is generally used by being inserted in a protective pipe.

A protecting tube in which a conventional thermocouple is inserted is produced by using the following materials. Various kinds of protective pipes are used which comprise BN (heat resisting temperature of 1000° C.) or porcelain (heat resisting temperature of 1400° C.) or alumina (heat resisting temperature of 1600° C.) or high chromium steel (heat resisting temperature of 1050° C.) or alundum (heat resisting temperature of 1400° C). When a thermocouple manufactured by using such a protective pipe is used at up to a heat resisting temperature thereof, it is broken in its first usage, and cannot be reused. Therefore, such a thermocouple is used for a temperature measuring purpose usually in an atmosphere of a temperature of around 600° C.–800° C. and around 1000° C. at the highest in practice.

The protecting tubes for thermocouples include, for example, protecting tubes disclosed in Japanese Patent Laid-Open Nos. 11574/1988 and 246636/1986.

The protecting tube for a thermocouple disclosed in Japanese Patent Laid-Open No. 11574/1988 referred to above is a protecting tube for a thermocouple used to measure the temperature of a molten metal. This tube has a double layer structure, the inner layer of which comprises sintered silicon nitride or a SiAlON ceramic material, and the outer layer of which comprises mainly $BN-SiO_2-Al_2O_3-Y_2O_3$.

The protecting tube for use in continuously measuring the temperature of molten steel disclosed in Japanese Patent Laid-Open No. 246636/1986 referred to above can be used as a protecting tube for a thermocouple, and is manufactured by packing AlN powder in a clearance between a protecting tube of reaction sintered silicon nitride and an inner pipe of alumina, and packing alumina wool in a space above the AlN powder. This protecting tube enables the reduction of a rate of corrosion thereof by molten steel and the long-term measurement of the temperature of molten steel.

However, a molded body packed in a conventional protecting tube is fragile, so that the breakage of the protecting tube occurs frequently. Therefore, it is difficult to manufacture such protecting tube of a large length. A protecting tube for a thermocouple is damaged considerably in practice at a temperature of 1000° C. or higher. Accordingly, a conventional thermocouple has in fact difficulty measuring the temperature of a high-temperature furnace and molten metal. For example, when a thermocouple is formed to a small-diameter tubular structure, problems concerning the manufacturing thereof arise since it is necessary to properly regulate the strength of a protecting tube for the thermocouple and the density of a filler in the protecting tube. A thermocouple having a protecting tube of BN is oxidized in the presence of $O_2$, and it is therefore used after the $O_2$ in the furnace has been discharged therefrom.

Even in a protecting tube, in which a thermocouple is to be provided, manufactured by using reaction sintered silicon nitride, a pair of wire rods of different kinds are inserted so as to extend longitudinally from one end thereof to the other. Unless a suitable material is selected as a filler to be packed in such a protecting tube, a clearance occurs between the inner surface of the protective pipe and the filler, and the wire rods are oxidized by the $O_2$ existing in the protective pipe or receive a thermal shock and are likely to be broken.

The self-controlling type of glow plug disclosed in Japanese Patent Publication No. 19404/1985 is provided in a front end portion of its shell of a heat resisting metal with a metal coil wound with a small pitch and having a high positive resistance temperature coefficient, and in a base end portion thereof with a metal coil wound with a large pitch and having a low positive resistance temperature coefficient, whereby the fusion of a temperature controller on this base end portion, which is ascribed to the overheating thereof, is prevented. Since the shell of this self-controlling type of glow plug is formed from a metal, the metal coils are connected at their base end portions to electrodes, and at their free end portions to the shell directly.

The sheath type glow plug (1) disclosed in Japanese Utility Model Publication No. 19583/1982 comprises a unitary structure formed by providing a metal coil (6) between outer and inner shells (8,7) of a ceramic material of silicon nitride, filling a space in the outer shell (8) formed by molding and sintering silicon nitride with ceramic powder of silicon nitride, and sintering the powder. Since the outer shell (8) is formed out of a ceramic material, the above-mentioned metal wire connecting method cannot be employed.

Figure 7:
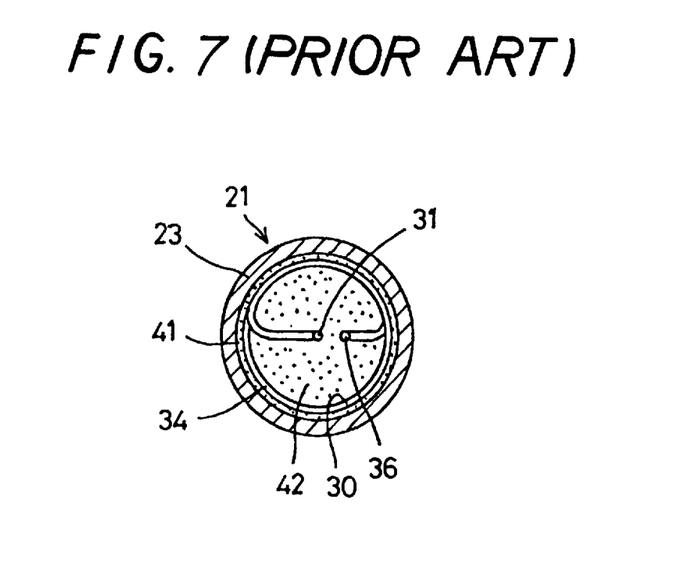
FIG. 7 is a sectional view of a conventional glow plug using a ceramic heater.
Figure 8:
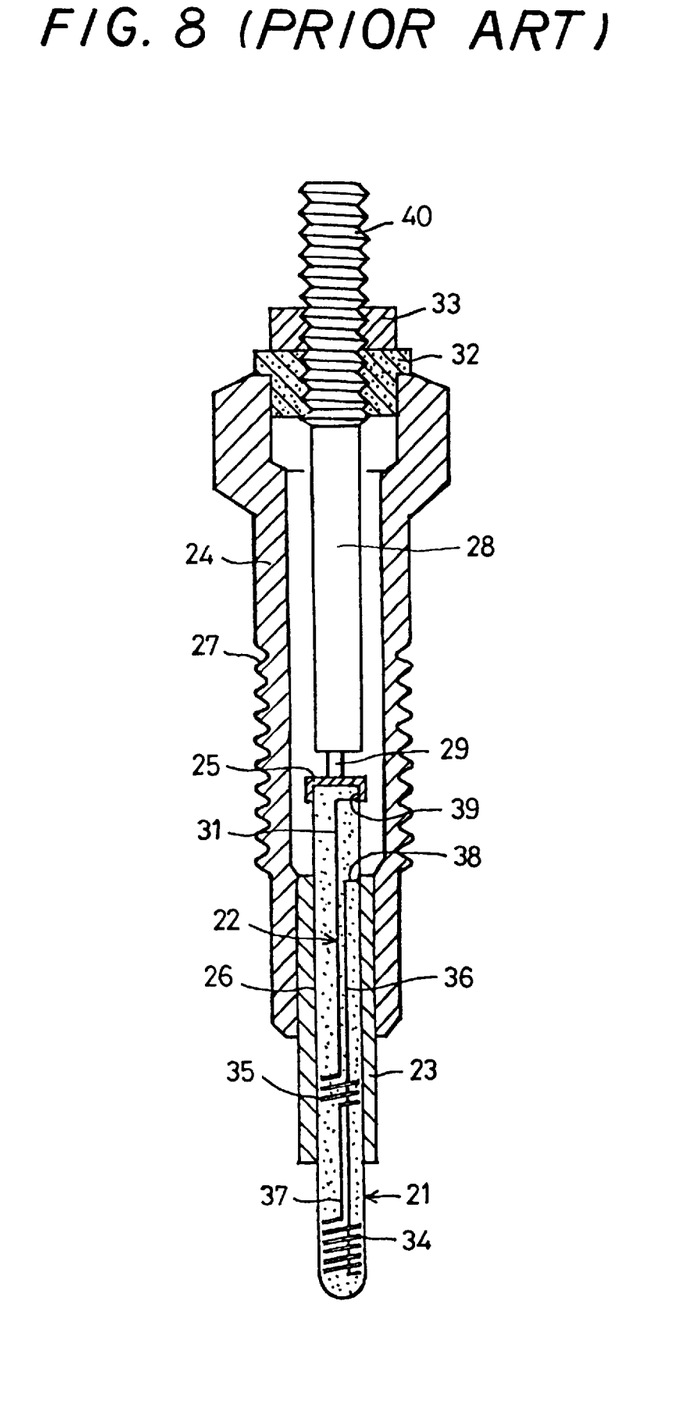
FIG. 8 is a sectional view of the conventional glow plug.

A conventional ceramic heater will now be described. A ceramic heater-carrying glow plug shown in FIGS. 7 and 8 is engaged with and supported on an engine body at a threaded portion 27 of a hollow metal body 24 of the former, and a ceramic heater 21 at a lower end portion of the metal body is projected into a combustion chamber of the engine. A metal protective cylinder 23 is fixed to the lower end portion of the metal body 24. An electrode 28 is engaged with and supported on an insulator 32 which closes an upper end of the metal body 24, and a nut 33 is engaged with and fixed to a threaded portion 40. The protective cylinder 23 is combined beforehand at its fitting portion 26 with the ceramic heater 21 by a metallization method.

A metal cap 25 is combined with an upper end portion of the ceramic heater 21. The cap 26 has a terminal 29 formed unitary therewith which contacts the electrode 28. The lower end portion of the ceramic heater 21 projects downward from the protective cylinder 23. A metal coil 22 is buried in the interior of the ceramic heater 21. The coil 22 comprises, for example, a tungsten coil of about 0.2 mm in diameter, and an upper end portion 39 of a lead portion 31 thereof is combined with the cap 25. The coil 22 extends straight in the downward direction through a substantially axial portion of the protective cylinder 23 and forms a helically wound current control portion 35 in the protective cylinder 23, a lead portion 37 being extended from the current control portion 35 in the downward direction to be wound helically outside the protective cylinder and form a heating portion 34. The coil 22 is folded back upward at a lower end of the helical heating portion 34 to form a lead portion 36. The lead portion 36 extends straight in the upward direction through the inner portion of the helical heating portion 34 and current control portion 35, and is fastened at an upper end portion 38 thereof to the upper end portion of the protective cylinder 23.

The helical heating portion 34 and current control portion 35 are molded out of a ceramic material, such as silicon nitride, and fitted in a sheath type or tubular sintered outer shell 41 so that the heating portion and control portion contact an inner surface 30 of the outer shell. An inner hollow portion of the outer shell 41 is filled with a sintered ceramic material 20. This non-contractile sintered ceramic material 20 is formed by packing ceramic powder containing at least silicon at the time of sintering in the outer shell 41 without leaving any clearance therein, and sintering the ceramic powder.

However, it is necessary in the ceramic heater 21 to connect the lead portion 31 at one end part of the coil 22 to an electrode 28, and fold back the end part of the heating portion 34 and connect the lead portion 36 to the base end portion of the protective cylinder 23. It has been ascertained observation using by transmitted X-rays that breakage occurs frequently in the lead portion of the coil 22 during the long-term use of the ceramic heater. It is considered that the breaking of wire occurs because the temperature gradient of the portion of the ceramic heater which is between the free end and base end thereof becomes large due to the straight extending lead portion of the coil 22, to cause an increase in the thermal stress exerted on the coil 22.

SUMMARY OF THE INVENTION

An object of the present invention is to solve these problems, and this invention relates to a ceramic sheath which is capable of preventing the breaking of a wire rod and preventing the breakage of a protective pipe by fixing a filler close thereto, and which has high thermal resistance, thermal shock resistance and durability, the part being obtained by forming a tubular or sheath type protective pipe out of a heat resisting ceramic material, such as $Si_3N_4$, SiAlON and silicon carbide, packing the protective pipe with a ceramic filler, burying and sealing a coil and a conductive wire strand in the filler, and forming the filler by inner and outer layer portions, and a method of manufacturing the same part.

This invention relates to a ceramic sheath including a tubular or sheath type protective pipe comprising one of silicon nitride, silicon carbide and SiAlON, a conductive wire rod provided in the protective pipe so as to extend longitudinally from one end thereof to the other, and a filler packed in the protective pipe so as to bury the conductive wire rod therein and comprising reaction sintered silicon nitride, wherein the filler comprises two layers, i.e. a core portion of a low sintering time size variation ratio, and a seal portion constituting a boundary layer between the core portion and the protective pipe and having a sintering time size variation ratio higher than that of the core portion.

In this ceramic sheath type part, an amount of addition of Ti in the core portion is 0–2 wt %, and that of addition of Ti in the seal portion not less than 5 wt % and less than 40 wt %, which is preferably 5–30 wt %. The seal portion contains an amorphous ceramic material into which organic silicon polymer is converted.

Since this ceramic sheath has a low Ti content in the core portion, the sinter-growth of this portion does not occur. During the calcining of the part, the conductive wire rod of W or W alloy buried inside thereof does not receive tensile stress which would break the wire rod. Since the seal portion has a high Ti content, it sinter grows to fill a clearance between the protective pipe and core portion and enables an excellent closely fitted condition of the filler to be secured, the occurrence of splits, cracks and rattle to be prevented, and the durability of the part to be improved.

This ceramic sheath, in which the conductive wire rod is formed by a heater coil comprising a heating portion and a resistance portion, can be applied to a glow heater.

When this ceramic sheath is formed so that it is provided with a conductive wire rod formed by a pair of different kinds of wire rods, it can be applied to a thermocouple. One of the wire rods can comprises W-5 % Re, and the other W-26 % Re.

The present invention also relates to a method of manufacturing ceramic sheath parts, comprising the steps of deposit-molding a Si-containing raw material on a conductive wire strand or a helical wire rod to obtain a molded body, calcining this molded body in a nitrogen atmosphere of not lower than 1200° C. to obtain a calcined body, applying a Si-containing paste type composite, the composition of which is different from that of the above-mentioned raw material, to the surface of this calcined body to obtain a laminate, and inserting this laminate in a protective pipe, which comprises one of silicon nitride, silicon carbide and SiAlON, and reaction sintering the resultant product in a nitrogen atmosphere of not lower than 1350° C.

In this method of manufacturing ceramic sheath parts, the raw material to be deposited comprises 0–2 wt % of Ti, and powder of Si and $Si_3N_4$ for the rest, and the paste type composite contains not less than 5 wt % and less than 40 wt %, preferably 5–30 wt % of Ti.

This method of manufacturing ceramic sheath parts includes an organic silicon polymer solution impregnation step before or after the reaction sintering step.

The ceramic sheath and the method of manufacturing the same according to the present invention are constituted as described above. Since the filler in the protective pipe comprises two layers i.e. a core portion of a low sintering time size variation ratio, and a seal portion forming a boundary layer between the core portion and the protective pipe and having a sintering time size variation ratio higher than that of the core portion, the wire rod buried in the core portion is not broken during a sintering operation. Since the seal portion grows to seal the clearance between the core portion and protective pipe, the wire rod is kept in a sealed state in the protective pipe, i.e., sealed in an atmosphere in which a gas, such as $O_2$ does not exist, so that the wire rod is not influenced by the outside air. Accordingly, the oxidation of the wire rod, which would causes it to be broken, does not occur, and a glow heater and a thermocouple having a high durability can be obtained.

The protective pipe is formed out of a heat resisting and anticorrosion ceramic material including $Si_3N_4$, SiC or SiAlON, and a wire rod is buried in the filler in the protective pipe. Therefore, the protective pipe has a structure having a high thermal shock resistance, and can provide not only a glow plug for diesel engines but also a thermocouple suitable for temperature measurement for the control of the temperature of a high-temperature furnace, such as a molten metal furnace, a plasma melting furnace and an electric furnace. Moreover, since the wire rod is held firmly in the filler and protected by the protective pipe, a ceramic sheath having high durability and temperature measuring accuracy and a stable reliability can be provided. This part is suitable, especially, for measuring a high temperature in the oxidizing and reducing atmosphere.

An object of the present invention is to provide a ceramic sheath formed in view of the above problems so that it rarely encounters the breaking of the coil of a metal wire and has a high durability, wherein a coil of a metal wire is inserted in a sheath type or tubular shell comprising a ceramic material, such as silicon nitride and SiAlON, the shell being filled with a sintered ceramic material which is different from the material constituting the shell, the coil of a metal wire having a helical lead portion.

This ceramic sheath is made by inserting a coil of a metal wire comprising tungsten (W) in the inner portion of a shell of a ceramic material, such as silicon nitride ($Si_3N_4$), filling a space between the shell and coil of a metal wire with a sintered ceramic material obtained by a reaction sintering method, setting the winding pitch of the current control portion of the coil of a metal wire larger than that of the heating portion, and setting the winding pitch of the base end part or the free end part of the current control portion slightly smaller so that heat is accumulated after the lapse of a predetermined period of time to cause the temperature of this portion to increase to a high level.

If a resistance value at room temperature of the free end part which is on one side of a winding pitch changing portion of the coil in this ceramic sheath, and which has a small coil winding pitch, a resistance value at room temperature of the coil as a whole, and the sum of the thermal capacity of the filler provided around the front end part of a small coil winding pitch, protective pipe and coil are represented by Ra, RT and CA respectively, a value of CA/(RA/RT) is 0.35–0.45 (J/°C.).

If a resistance value at room temperature of the base end part which is on the other side of the winding pitch changing portion of the coil, and which has a large coil winding pitch, a resistance value at room temperature of the coil as a whole, and the sum of the thermal capacity of the filler provided around the base end part of a large coil winding pitch, protective pipe and coil are represented by RB, RT and CB respectively, a value of CB/(RB/RT) is 1.0–0.71 (J/°C.).

In this ceramic sheath, the lead portion of the coil of a metal wire is formed helically. Therefore, the electric current flowing in the lead portion is limited, and the temperature gradient of a region from the heating portion to the current control portion is moderated. Accordingly, the thermal stress due to a difference in the temperatures of the heating portion and current control portion is alleviated, and the breaking of the coil of a metal wire due to the overheating thereof can be prevented.

DESCRIPTION OF THE PREFERRED EMBODIMENTS

The embodiments of the ceramic sheath and its manufacturing method according to the present invention will now be described with reference to FIGS. 1 and 4.

Figure 1:
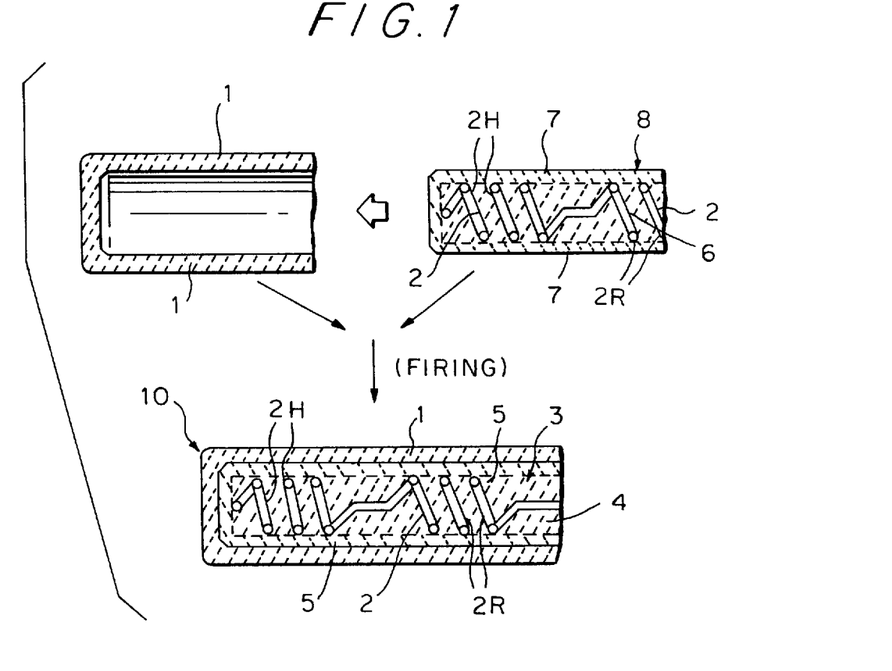
FIG. 1 is an explanatory view of an example of the production of a glow heater in the ceramic sheath manufacturing method according to the present invention.
Figure 4:
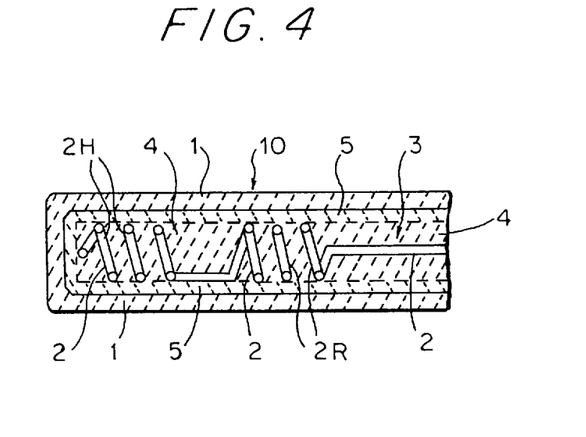
FIG. 4 is a sectional view showing an example of a glow heater to which the ceramic sheath according to the present invention is applied.

FIGS. 1 and 4 show an embodiment in which this ceramic sheath is applied to a glow heater. When this ceramic sheath is formed as a glow heater 10, a conductive wire rod 2 is formed by a coil comprising, for example, a heating portion (for example, a Fe—Cr coil) 2H, and a resistance portion (Ni coil) 2R. This glow heater 10 as a ceramic sheath comprises, as shown in FIG. 1 or 4, a sheath of one of silicon nitride, silicon carbide and SiAlON, in the form of a protective pipe 1 having a tubular body, a conductive wire rod 2 provided in the protective pipe 1 so as to extend from one end thereof to the other longitudinally without contacting the protective pipe, and a filler 3 comprising reaction sintered silicon nitride and packed in the protective pipe 1 so as to bury the conductive wire rod 2 therein, the filler 3 comprising inner and outer layers, i.e. a core portion 4 and a seal portion 5 which forms a boundary layer between the core portion 4 and the protective pipe 1. In the filler 3, the core portion 4 is formed out of reaction sintered silicon nitride of a low sintering time size variation ratio, and the seal portion 5 reaction sintered silicon nitride of a sintering time size variation ratio larger than that of the core portion 4.

Figure 3:
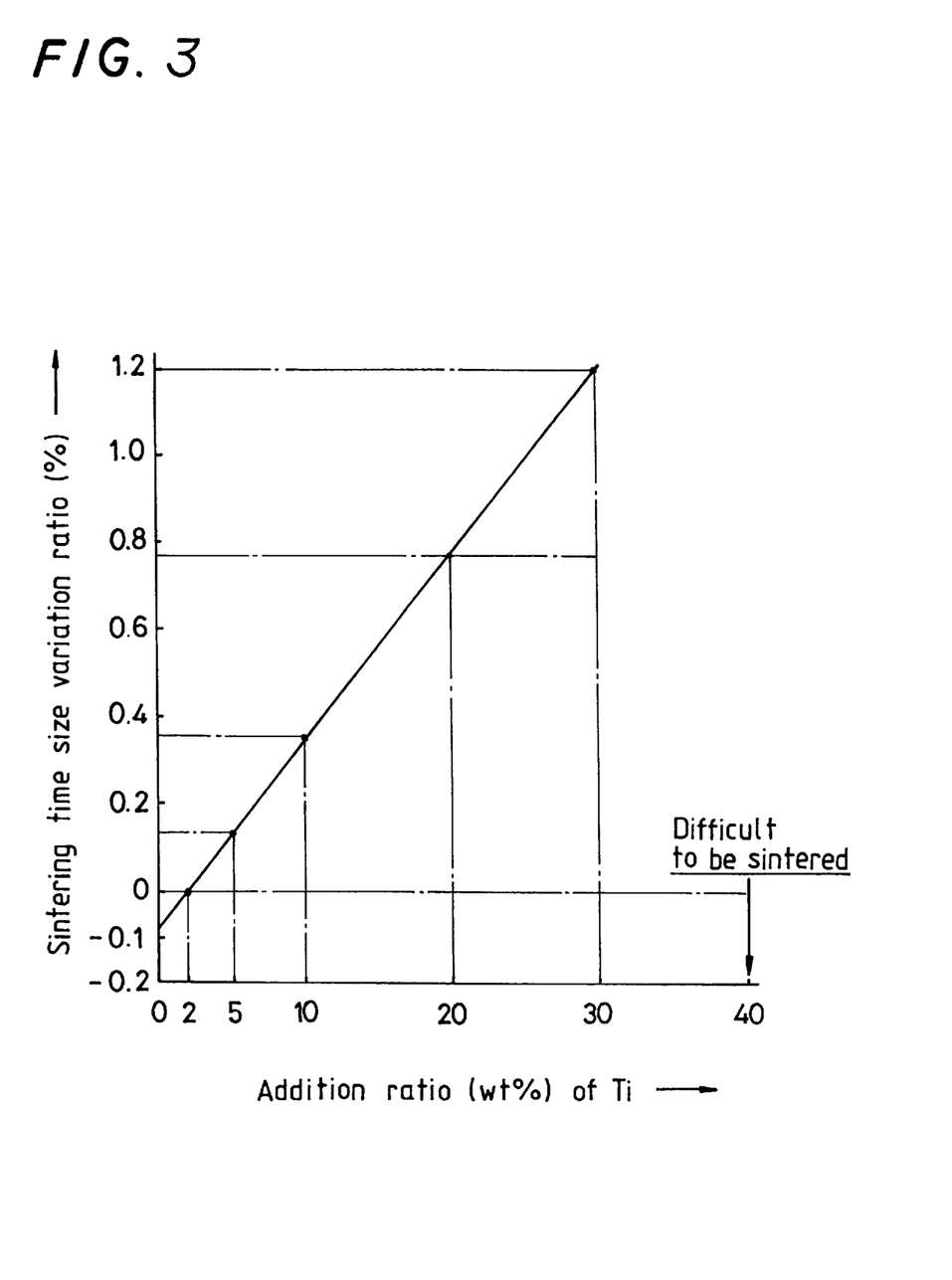
FIG. 3 is a graph showing a sintering time size variation ratio of a filler with respect to an amount of addition of Ti.

FIG. 3 is a graph showing the relation between a Ti addition ratio (wt %) and a sintering time size variation ratio (%). In FIG. 3, a Ti addition ratio (wt %) is shown by a ratio (wt %) obtained by dividing an amount of Ti by the sum of the amounts of Ti, Si and $Si_3N_4$. When the Ti addition ratio is not less than 40 wt %, the sintering of a molded body is difficult.

In this ceramic sheath, the amount of addition of Ti in the core portion 4 is 0–2 wt %, and that of addition of Ti in the seal portion 5 not less than 5 wt % and less than 40 wt % and preferably 5–30 wt %. As is understood from FIG. 3, when the Ti addition ratio is 0–2 wt %, the sintering time size variation ratio is −0.1–0%. When the Ti addition ratio is 5–30 wt %, the sintering time size variation ratio is +0.2–1.2%.

The seal portion 5 contains an amorphous ceramic material to which an organic silicon polymer is converted. An uncalcined molded body or a calcined molded body is immersed in an organic silicon polymer to impregnate the molded body or calcined body with the organic silicon polymer, and the resultant product is subjected to reaction sintering to convert the organic silicon polymer to amorphous ceramic material. This amorphous ceramic material becomes compatible with and closely contacts the inner surface of the protective pipe 1. Consequently, the rattling and breakage of the filler 3 in the protective pipe 1 can be prevented, and this enables the sealed condition of the sheath to be kept excellent, and prevents the conductive wire rod from being influenced by the outside air.

The method of manufacturing this ceramic sheath will now be described. This ceramic sheath manufacturing method is characterized in that it comprises the steps of deposit-molding a Si-containing raw material on a conductive wire rod or a helical wire rod to obtain a molded body, calcining this molded body in a nitrogen atmosphere of not lower than 1200° C. to obtain a calcined body, applying a Si-containing paste type composite, the composition of which is different from that of the above-mentioned raw material, to the surface of this calcined body to obtain a laminate, and inserting this laminate in a protective pipe, which comprises one of silicon nitride, silicon carbide and SiAlON, and reaction sintering the resultant product in a nitrogen atmosphere of not lower than 1350° C.

In this ceramic sheath manufacturing method, the raw material to be deposited comprises 0–2 wt % of Ti, and powder of Si and $Si_3N_4$ for the rest, and the paste type composite contains 5–30 wt % of Ti. This ceramic sheath manufacturing method is characterized in that it includes an organic silicon polymer solution impregnation step before or after the calcining step.

Figure 2:
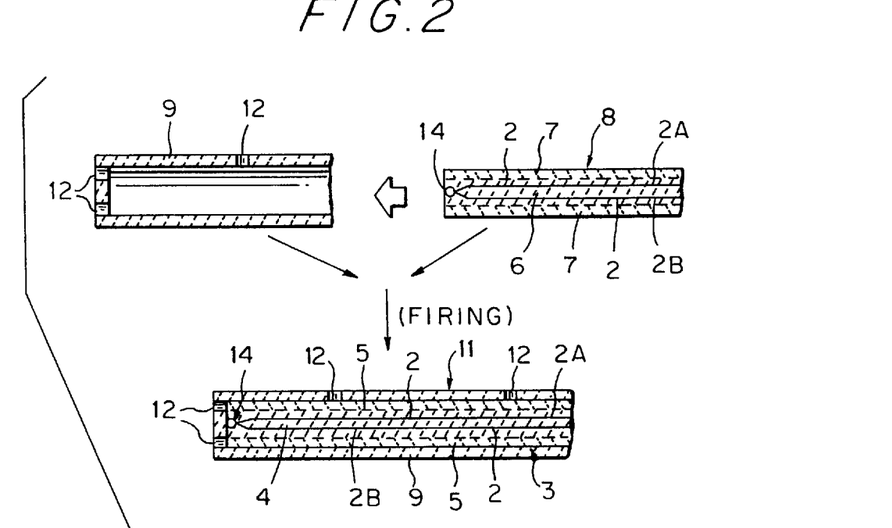
FIG. 2 is an explanatory view of an example of the production of a thermocouple in the ceramic sheath manufacturing method according to the present invention.
Figure 5:
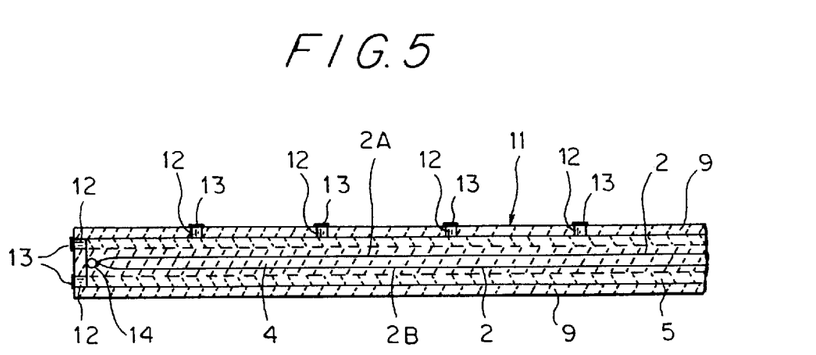
FIG. 5 is a sectional view showing an example of thermocouple to which the ceramic sheath according to the present invention is applied.

An embodiment in which this ceramic sheath is applied to a thermocouple will now be described with reference to FIGS. 2 and 5. In order to manufacture this ceramic sheath as a thermocouple 11, a conductive wire rod 2 is formed by two kinds of wire rod members, one 2A of which is formed out of W-5% Re, and the other 2B of which is formed out of W-26% Re. An elongated sheath 9 of a small diameter is used as a protective pipe. Since the remaining portion of this embodiment has the same construction and function as the corresponding portion of the previously-described embodiment, duplicated descriptions are omitted.

(EXAMPLE 1)

An example of the production of a heater by this ceramic sheath manufacturing method will now be described with reference to FIG. 1. First, a raw material comprising powder of Si, Ti and $Si_3N_4$ was deposited on a W coil 2 as a conductive wire rod of 0.2 mm in diameter, and the resultant product was calcined at a temperature of 1300° C. in a nitrogen atmosphere to obtain a core portion-forming calcined body 6. Meanwhile, a pipe 1, 6 mm in inner diameter and 35 mm in length, capable of being fitted around the core portion-forming calcined body 6 and comprising $Si_3N_4$ was made. Paste 7 comprising a kneaded product of the same raw material as mentioned above and an organic binder was applied to the surface of the core portion-forming calcined body 6 to obtain a molded body 8. The molded body 8 was inserted in the pipe 1, and the resultant product was subjected to finishing calcining at 1400° C. in a nitrogen atmosphere, whereby a filler 3 in which the core portion-forming calcined body 6 was converted to a core portion 4 with the paste 7 converted to a seal portion 5 was obtained. Thus, a heater 10 with the filler 3 provided in the pipe 1 was made.

The heater 10 has a structure in which the seal portion 5, to which the paste 7 was converted, is provided between the pipe 1 and the core portion 4. Such a type of heaters 10 were made with the composition of the raw materials for the core portions 4 and seal portions 5 changed variously. The cross sections of the various heaters 10 obtained were observed, and these heaters 10 was subjected to current application tests. The results are shown in Table 1.

As is clear from Table 1 showing the results of wire breakage tests on samples 1–10, it has been ascertained that an amount of addition of Ti of 0–2 wt % in the core portion and an amount of addition of Ti of 5–30 wt % in the seal portion constitute an excellent heater 10. As is understood from Table 1, when the amount of addition of Ti in the core portion 4 is increased, the amount of growth during the sintering time increases as shown in the graph of FIG. 3. When the amount of growth increases during the sintering time, tensile stress is exerted on the W wire 2 as a conductive wire, which is buried in the core portion 4, in the diametrical direction thereof, so that the W wire 2 becomes liable to be broken.

(EXAMPLE 2)

An example of the production of a thermocouple by this ceramic sheath type part manufacturing method will now be described with reference to FIGS. 2 and 5. In this example, a wire rod 2 in which two kinds of wire rods, i.e. a wire rod 2A comprising W-5% Re and a wire rod 2B comprising W-26% Re were series connected at their end portions 14 was selected, and a raw material to which 2 wt % of Ti was added was deposited on this wire rod 2 to form a molded body 6 mm in outer diameter and 300 mm in length. This molded body was calcined at 1300° C. in a nitrogen atmosphere in the same manner as in Example 1 to obtain a core portion-forming calcined body. Meanwhile, a pipe, 6 mm in inner diameter and 300 mm in length, capable of being fitted around the core portion-forming calcined body 6 and comprising $Si_3N_4$, i.e. a sheath 9 was manufactured. The sheath 9 is provided with a plurality of spaced through holes 12, for example, 0.5 mm in diameter. Paste 7 to which 20 wt % of Ti was added was then applied to the surface of the core portion-forming calcined body 6 to obtain a molded body 8. This molded body 8 was inserted in the pipe constituting the sheath 9, and the resultant product was subjected to finishing calcining at 1400° C. in a nitrogen atmosphere. Thus, a filler 3 in which the core portion-forming calcined body 6 was converted to a core portion 4 with the paste 7 converted to a seal portion 5 was obtained, i.e., a thermocouple 11 with the filler 3 provided in the sheath 9 was obtained. If the through holes 12 are formed in the sheath 9 of a large length so as to promote the reaction sintering operation, the raw material comprising the powder of Si, Ti and $Si_3N_4$ is reaction sintered in the reaction sintering step and converted to a reaction sintered ceramic material. The through holes 12 of the sheath 9 are then closed with ceramic films 13 as shown in FIG. 5, to seal the sheath 9, whereby the conductive wire rod 2 is sealed in the sheath 9.

The thermocouple 11 has a structure in which the seal portion 5 to which the paste 7 was converted exists between the sheath 9 and core portion 4. Such a type of thermocouples 11 were manufactured with the composition of the raw materials of the core portions 4 and seal portions 5 changed variously. Various types of thermocouples 11 thus obtained were subjected to the observation of the cross sections thereof and current application tests. Consequently, results similar to those in Example 1 were obtained.

(EXAMPLE 3)

In this example, a W coil 0.2 mm in diameter was selected as the conductive wire rod 2. A raw material comprising the powder of 60 wt % of Si and 40 wt % of $Si_3N_4$ was deposited on this wire rod 2 to obtain a molded body. This molded body was calcined in the same manner as in Example 1 at 1300° C. in a nitrogen atmosphere to obtain a core portion-forming calcined body 6. Paste 7 comprising a kneaded material of powder of 40 wt % Si and 60 wt % $Si_3N_4$ and an organic binder was then applied to the surface of the core portion-forming calcined body 6 to obtain a molded body 8. In the meantime, a protective pipe 1 comprising $Si_3N_4$ was formed to 6 mm in inner diameter and 35 mm in length. The molded body 8 was inserted in the protective pipe 1 and subjected to finishing firing at 1400° C. in a nitrogen atmosphere. Owing to the reaction sintering, a filler 3 in which the core portion-forming calcined body 6 was converted to a core portion 4 with the paste 7 converted to a seal portion 5 was obtained, whereby a glow heater 10 with the filler 3 provided in the protective pipe 1 was produced. The paste 7 grows during the firing operation, and the seal portion 5 was put in an excellently and closely contacting state with respect to the inner surface of the protective pipe 1.

(EXAMPLE 4)

In a method identical with that used in Example 3, in which a molded body 8 was immersed in a toluene solution of 20 wt % of polycarbosilane (PCS) before the molded body was calcined to obtain a core portion-forming calcined body 6, and the molded body 8 was left as it was under vacuum for 10 minutes to make the solution infiltrate into the voids in the molded body 8. The resultant molded body 8 was inserted in a protective pipe 1, and the product thus obtained was subjected to finishing firing in the same manner as in the previously-described Examples. Owing to this process, a heater having no clearances between the core portion 4 and protective pipe 1 could be obtained. In this glow heater, an amorphous ceramic material to which the polycarbosilane (PCS) was converted was formed.

(EXAMPLE 5)

In a method identical with that used in Example 3, in which a core portion-forming calcined body 6 was immersed in a toluene solution of 20 wt % of polycarbosilane (PCS) after the calcined body 6 was made, and the calcined body 6 was left as it was under vacuum for 10 minutes to make the solution infiltrate into voids in the calcined body 6. The resultant core-forming calcined body 6 was inserted in a protective pipe 1 in the same manner as in the above-described Examples, and the product thus obtained was subjected to finishing firing. Owing to this process, a heater having no clearances between the core portion 4 and protective pipe 1 could be obtained. In this heater, an amorphous ceramic material to which the polycarbosilane (PCS) was converted was formed.

Figure 6:
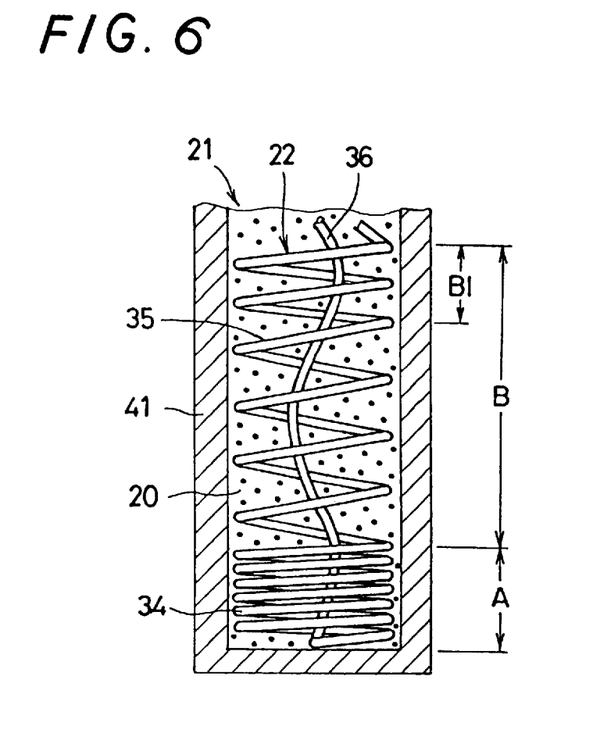
FIG. 6 is a sectional view showing another example of the ceramic sheath according to the present invention.

Another embodiment of the ceramic sheath according to the present invention will now be described with reference to FIG. 6. In the ceramic sheath type part in this embodiment, a ceramic heater 21 has a coil 22 of a metal wire comprising tungsten (W) inserted inside of a sheath type or tubular shell 41 which constitutes a protective pipe of a ceramic material, such as silicon nitride ($Si_3N_4$), and a sintered ceramic material as a filler packed between the shell 41 and the coil 22 of a metal wire.

A slurry containing silicon (Si) and titanium (Ti) is deposited on the coil 22 in advance. Although the Ti contained in the slurry has an effect of growing the same slightly during a sintering operation, it is not necessarily added to the slurry. The coil on which the slurry is thus deposited is inserted in a shell 41, 0.8 mm in wall thickness, comprising silicon nitride, and a ceramic sintered material 20 is packed in a hollow portion of the shell 41. When the raw materials (the ceramic sintered material constituting the shell and filler and slurry) are nitrided in a nitrogen atmosphere by a reaction sintering method, a ceramic heater 21 in which the shell 41, sintered ceramic material 36 and coil 22 are unitarily combined is obtained.

The coil 22 (0.2 mm in wire diameter and 3.2 mm in winding diameter) was formed by setting the winding pitch of a heating portion 34 at a free end side thereof to 0.3 mm, that of a current control portion 35 at the base end side thereof to 1 mm and that of a base end part or a terminal end part B1 of the current control portion 35 to 0.7 mm so that heat was accumulated to cause the temperature to increase after the lapse of a predetermined period of time after the starting of the current application. In the embodiment of FIG. 6, the current control portion 35 and heating portion 34 are formed continuously with different winding pitches, the coil 22 being folded back toward the base at the front end part of the heating portion 34 to form a lead portion 36. At an end part of the current control portion 35 is not provided with a lead portion, and, when a lead portion is provided at this part, the length thereof is set to the lowest possible level.

In order to moderate the thermal stress ascribed to a difference between the temperature of the heating portion 34 and that of the current control portion 35, the lead portion 36 of the coil 22 is also formed helically. When the ceramic heater 21 is applied to the heating portion of a glow plug for a diesel engine, it is formed in the same manner as the conventional example shown in FIGS. 7 and 8.

Another embodiment of the ceramic sheath according to the present invention will now be described. In the ceramic sheath in this embodiment, the ceramic heater 21 has the coil 22, which comprises tungsten (W), inserted in the shell 41 of silicon nitride ($Si_3N_4$), and a sintered ceramic material 20 produced by a reaction sintering method is packed in a hollow between the shell 41 and coil 22 (0.2 mm in wire diameter and 3.2 mm in winding diameter), in the same manner as in the above-described embodiment. In the embodiment formed in the same manner as in the conventional example, the winding pitch of the heating portion 34 at the front end side of the coil 22 and that of the current control portion 35 at the base end side thereof were set equal.

In order to moderate the thermal stress ascribed to a difference between the temperature of the heating portion 34 and that of the current control portion 37, the lead portion 36 of the coil 22 was formed helically.

The ceramic heater 21 was subjected to temperature rise characteristics tests and durability tests by connecting a copper wire to both ends of the coil 22 and applying a voltage of 11V thereto. The durability tests were conducted by applying an electric current to the coil 22 for one minute and then stopping the application of the electric current for three minutes. These operations were repeated. It was ascertained that, when an electric current was applied to the coil 22 of the ceramic heater 21 for one minute and then stopped with the ceramic heater left as it was for three minutes, the temperature of the surface of the ceramic heater became around 40° C.

The results of these durability tests are shown in Table 1. It is understood that, although the temperature rise characteristics of the ceramic heaters 21 do not vary greatly, a ceramic heater in which the lead portion 36 of the coil 22 provided inside of the shell 41 is formed helically as in the present invention enables the durability thereof to be improved.

The reasons for the above reside in the following. When the lead portion 36 of the coil 22 is formed helically, the temperature gradient is small, so that the thermal stress exerted on the coil 22 is moderated, whereby the breaking of the wire rarely occurs. When the winding pitch of the base end portion B1 of the coil 22 is set low, heat is accumulated after the lapse of a predetermined period of time, and the temperature rises. Consequently, the resistance value of the coil 22 becomes large, and the

TABLE 1

[Results of breakage tests on wire rods]

| Sample No. | Addition ratio (wt %) of Ti in the core portions | Addition ratio (wt %) of Ti in the seal portions | Closely contacting condition of protecting tubes of silicon nitride and the condition of breaking of wire rods |
|---|---|---|---|
| 1 | 0 | 1 | clearances occurred |
| 2 | 0 | 5 | Satisfactory |
| 3 | 1 | 0 | clearances occurred |
| 4 | 1 | 5 | Satisfactory |
| 5 | 1 | 10 | Satisfactory |
| 6 | 2 | 20 | Satisfactory |
| 7 | 2 | 30 | Satisfactory |
| 8 | 3 | 10 | broken |
| 9 | 5 | 20 | broken |
| 10 | 5 | 30 | broken | saturation temperature decreases. Namely, the amount of current flowing in the lead portion 36 of the coil 22 is reduced, and the overheating, which causes the lead portion 36 to be broken, of the lead portion 36 is prevented.

Referring to Table 2, the comparative example 1 shows test results of an example provided with a linear lead portion 37 between the current control portion 35 and heating portion 34 of such a coil 22 as is shown in FIG. 8, and linear lead portions 31, 36 at both ends of the same coil 22, and the comparative example 2 test results of an example not provided with a linear lead portion 37 at an intermediate part of the coil 22 but provided with linear lead portions 31, 36 at both ends of the same coil.

Regarding each comparative examples, the broken portion of the coil was determined by using transmitted X-rays to discover that breakage occurred in the lead portion of the coil in many cases. When the lead portion of the coil extends linearly, the temperature gradient of the portion of the ceramic heater 21 which is from the front end to the base and thereof is large. Therefore, it is considered that the thermal stress exerted on the coil becomes large to cause the breaking of the wire to occur.

TABLE 2

[Results of durability tests]

| Sample No. | Time (second) required to reach 900° C. | Maximum temperature (°C.) after the lapse of 60 seconds | Number of repetitions of intermittent current application until the occurrence of breaking of wires |
| --- | --- | --- | --- |
| Present invention 1 | 3.9 | 1183 | not less than 10000 times |
| Present invention 2 | 3.9 | 1205 | not less than 10000 times |
| Comparative example 1 | 3.9 | 1189 | 952 times |
| Comparative example 2 | 3.9 | 1193 | 2500 times |

In order to discuss the relation between a value of CA/(RA/RT), wherein CA represents the sum of the thermal capacity (specific heat×density×volume) of the front end side heating portion A (FIG. 6) of the ceramic heater 21 according to the present invention, CB the sum of the thermal capacity of the base end side current control portion B thereof, RA the resistance of the front end side heating portion 34 of the coil 22, RB the resistance of the base end side current control portion 35 of the coil 22, and RT the resistance of the coil as a whole and the performance of the heater, and the relation between a value of CB/(RB/RT) and a saturation temperature, samples 11–23 were manufactured. Regarding these samples, the time (second) required for the samples to reach 900° C. and a maximum temperature (°C.) 60 seconds afterward were measured to obtain the results shown in Table 3. The values of CA/(RA/RT) and CB/(RB/RT) relative to the samples 15–19 out of the samples 11–23 became 0.35–0.45 J/°C. and 1.0–0.71 J/°C. respectively, and it was proven that excellent performance was obtained.

What is claimed is:

1. A ceramic sheath device comprising a protective pipe of any one of silicon nitride, silicon carbide and SiAlON, a conductive wire rod provided in said protective pipe so as to extend longitudinally from one end to the other thereof, and a filler of reaction sintered silicon nitride packed in said protective pipe so as to bury said conductive wire rod therein, said filler comprising a first filler layer comprising a core portion having a low sintering time size variation ratio, and a second filler layer comprising a seal portion constituting a boundary layer between said core portion and said protective pipe and having a sintering time size variation ratio higher than that of said core portion.

2. A ceramic sheath device according to claim 1, wherein an amount of addition of Ti in said core portion is 0–2 wt %, an amount of addition of Ti in said seal portion being from 5 wt % to 40 wt %.

3. A ceramic sheath device according to claim 1, wherein said seal portion contains an amorphous ceramic material to which an organic silicon polymer has been converted.

4. A ceramic sheath device according to claim 1, wherein said sheath device is a glow heater wherein said conductive wire rod comprises a heater coil.

5. A ceramic sheath device according to claim 1, wherein said sheath device is a thermocouple wherein said conductive wire rod comprises a pair of different kinds of wire rods.

6. A ceramic sheath device according to claim 5, wherein one of said wire rods comprises W-5% Re, the other comprising W-26% Re.

7. A ceramic sheath device according to claim 1, wherein said conductive wire rod is formed by a coil of a metal wire,

TABLE 3

[Results of performance tests]

| Sample No. | CA/(RA/RT) [J/°C.] | CB/(RB/RT) [J/°C.] | Time (second) required to reach 900° C. | Maximum temperature (°C.) after the lapse of 60 seconds |
| --- | --- | --- | --- | --- |
| 11 | 0.20 | 0.7 | 2.7 | 1241 |
| 12 | 0.25 | 0.7 | 3.1 | 1237 |
| 13 | 0.30 | 1.5 | 3.1 | 1205 |
| 14 | 0.30 | 1.2 | 3.2 | 1200 |
| 15 | 0.35 | 1.0 | 3.3 | 1197 |
| 16 | 0.35 | 0.8 | 3.4 | 1192 |
| 17 | 0.35 | 0.71 | 3.9 | 1183 |
| 18 | 0.4 | 0.71 | 4.2 | 1181 |
| 19 | 0.45 | 0.71 | 4.3 | 1181 |
| 20 | 0.5 | 0.71 | 5.2 | 1161 |
| 21 | 0.55 | 0.75 | 5.5 | 1154 |
| 22 | 0.6 | 0.77 | 6.0 | 1150 |
| 23 | 0.65 | 0.80 | 6.8 | 1145 | said coil being inserted in said protective pipe and formed so as to have a helical lead portion.

8. A ceramic sheath device according to claim 7, wherein the winding pitch of said coil is set small, large and small in the mentioned order from a front end portion of said protective pipe toward a base end portion thereof.

9. A ceramic sheath device according to claim 7, wherein said coil comprises tungsten (W).

10. A ceramic sheath device according to claim 1, wherein said filler contains at least silicon and titanium.

* * * * *